Jan. 3, 1956 P. J. BERNER ET AL 2,729,713
SWITCH
Filed Aug. 31, 1954
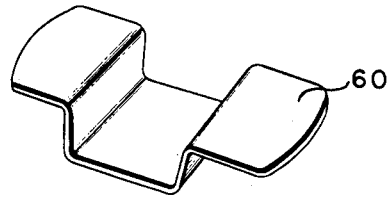
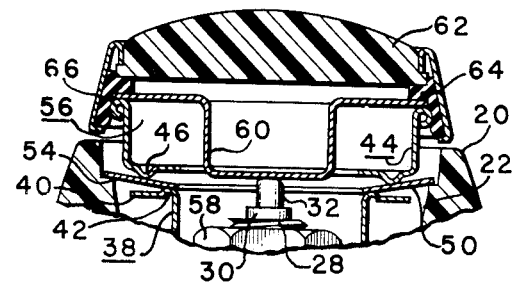
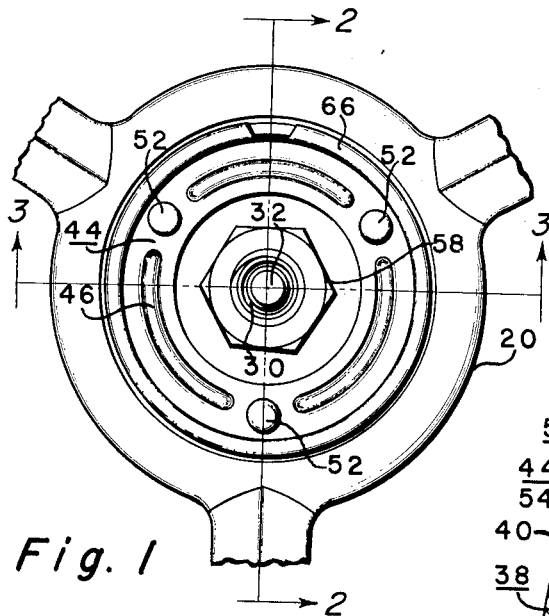
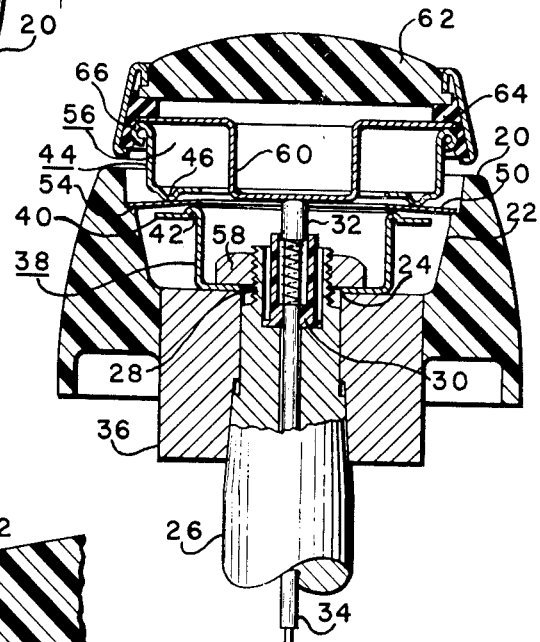
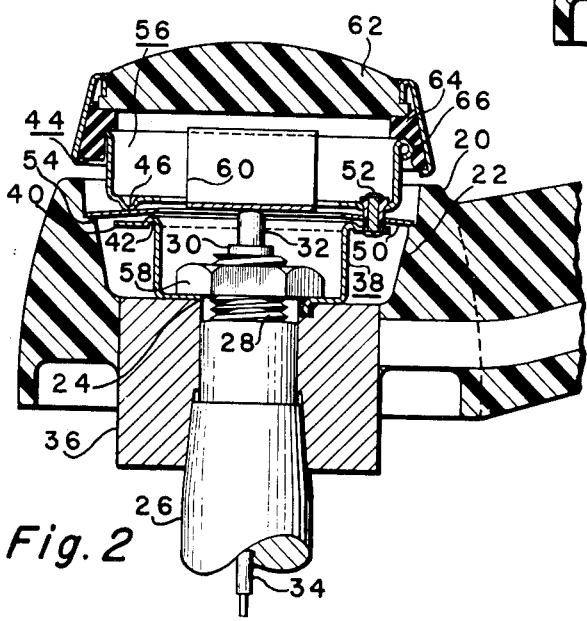
INVENTORS
Philip J. Berner
James D. Connell
BY
Their Attorney

United States Patent Office 2,729,713
Patented Jan. 3, 1956

2,729,713

SWITCH

Philip J. Berner and James D. Connell, Dayton, Ohio, assignors to General Motors Corporation, Detroit, Mich., a corporation of Delaware Application August 31, 1954, Serial No. 453,347

4 Claims. (Cl. 200—61.54)

This invention relates to horn blowing assemblies of the types used in connection with steering wheels for vehicles.

It is an object of the invention to provide an improved horn blowing mechanism adapted for assembly in the hub of a steering wheel such as is used in connection with an automotive vehicle and the like.

In carrying out this object it is a further object to provide a horn blowing assembly, or device which acts in the manner of a snap switch.

Another object of the invention is to provide a unitary horn blowing assembly wherein all the parts thereof are assembled into a unit which may be dropped in place within the hub of a steering wheel for opening and closing the horn circuit.

Still another object of the invention is to provide a unitary horn blowing assembly which employs a Bellville type spring as a snap member, which spring is held between two cup members through the use of insulated rivets wherein the spring and cups are positioned within a hub of a steering wheel with the Bellville spring resting upon a shoulder in a hub cavity, the lower of said two cups being fixedly attached to the steering wheel and column while the upper of said two cups supports the cap for said hub.

Further objects and advantages of the present invention will be apparent from the following description, reference being had to the accompanying drawings, wherein preferred embodiments of the present invention are clearly shown.

In the drawings:

Figure 1 is a fragmentary plan view with the cap removed of the assembly in place of a steering wheel hub;

Figure 2 is a view in section taken on line 2—2 of Figure 1 with the cap in place with the mechanism in open circuit position;

Figure 3 is a view in section taken on line 3—3 of Figure 1 with the cap in place with the mechanism in open circuit position;

Figure 4 is a fragmentary sectional view showing the horn blowing mechanism in closed circuit position; and Figure 5 is a perspective view of the contact strap used in connection with the mechanism.

Horn blowing mechanisms have been used for sometime in connection with steering wheels wherein the mechanism is actuated by a cap or button in the center of the wheel which cap or button may include a spider integrally formed therewith to provide a horn blowing ring which is spaced intermediate between the center of the wheel and the rim thereof. In all of the prior art type devices which utilize Bellville springs as an actuating member, the parts are assembled within a cavity in the hub of the wheel and are necessarily adjusted for proper actuation therein. In the present invention the horn blowing assembly is made in a unit wherein all of the parts are assembled remote from the wheel and wherein the assembly may be dropped into the wheel cavity and held in place by means of the nut which is used to hold the wheel onto the steering column. This type of assembly may be adjusted remote from this wheel and thus helps to reduce production costs while making a more useful assembly that is not subjected to frequent adjustments.

Referring specifically to the drawings, a steering wheel hub is shown at 20 which includes a central cavity 22 therein. The lower end of the cavity is apertured as at 24 to permit the end of a steering column 26 to project therethrough. The end of the steering column is threaded as at 28. Within the steering column is an insulated bushing 30 which includes a spring pressed reciprocal brush 32 journaled therein, which brush is connected by means of a wire 34 to one side of an electrical circuit. The other side of the electrical circuit is provided by grounding of the metallic hub portion 36 of the wheel.

The horn blowing arrangement comprises three main parts, namely, a lower cup member 38 which has a central aperture therethrough and an outwardly extending flange 40 which includes an upwardly extending bead 42 therearound. This bead may be either continuous or interrupted as desired and is preferably positioned closely adjacent the inner periphery of the flange. An upper cup member 44, also apertured adjacent the central portion thereof, includes a bead 46 which is adjacent the outer periphery of the inturned flange or bottom thereof. This bead, as in the case of bead 42, may be continuous or interrupted as desired. It will be noted that the beads 42 and 46 are of different diameters with the bead 42 being of a smaller diameter. Between the two cup members 38 and 44 is positioned a Bellville spring 50. The term "Bellville spring" is used to include any of the usual finger type or plate-like springs. The spring 50 is apertured in the center portion and is of a greater outer diameter than either cup member. In assembly of the mechanism a plurality of rivets 52 are used which pass through the flange 40 and the bottom of cup 44 and also pass through the Bellville spring 50. These rivets are insulated from the upper cup member 44 and the Bellville spring 50 and loosely engage all of the parts to act as an assembly means to maintain the members and spring in predetermined coaxial relation and also to act as a means for limiting the outward movement of the upper cup member 44 with respect to the lower cup member 38.

In use of the device, the cavity 22 in the hub 20 which includes a shoulder portion 54 therearound that is substantially the same diameter of the Bellville spring 50 receives the assembly 56 which includes the cup member 38, cup member 44, spring 50 and rivets 52 with the Bellville spring 50 resting on shoulder 54. In this position the bottom of cup 38 rests on the bottom of the cavity and the apertured portion of the cup permits the threaded end 28 of the steering column 26 to pass therethrough. After the parts are positioned within the cavity, a nut 58 is passed through the aperture of cup 44 and Bellville spring 50 and is threaded onto the steering column 26 to hold the assembly 56 in tight clamped relation with the hub 20 with the spring 50 resting on the shoulder 54. In the environment the parts will assume the position shown in Figure 2 wherein the Bellville spring does not touch the bead 42 but is in contact with the bead 46.

In order to complete the electrical circuit, a strap member 60 is placed across the top of cup 44 so that it rests upon the brush 32 and depresses the brush slightly against the spring which backs it up. The assembly of the strap 60 with the cup 44 is maintained by snapping the steering wheel cap 62 over the cup wherein any suitable means may be used for fixing it thereto. In the present instance a resilient annular bushing 64 is provided in the cap which includes a groove therearound that snaps over a rolled bead 66 on the upper cup member 44. Obviously, other methods of assembly may be used and this forms no part of the invention.

Since the brush 32 carries current from one side of the current source and since the metal base 36 of the cavity 22 is grounded to the other side of the current source, it is apparent that when the cap 62 is depressed slightly, the bead 46 will cause the Bellville spring to flex and snap downwardly from the position shown in Figures 2 and 3 to the position shown in Figure 4 wherein the Bellville spring is in contact with the bead 52 which is connected to the other side of the current source. In this position the circuit to the horn or other signal device is completed. Upon release of pressure on the cap 62 the Bellville spring immediately assumes its normal position as shown in Figure 2 whereupon the circuit is broken since the Bellville spring no longer contacts the bead 42.

It will be seen from this description that the horn blowing mechanism 56 may be assembled in the steering wheel by merely placing the assembly in the cavity and tightening down the nut 58. Disassembly may be accomplished by a reversal of these operations.

While the forms of embodiment of the present invention as herein disclosed constitute preferred forms, it is to be understood that other forms might be adopted, as may come within the scope of the claims which follow.

What is claimed is as follows:

1. A horn blowing mechanism for assembly in a vehicular steering wheel that includes a central cavity having a shoulder therearound comprising in combination; a unitary assembly having upper and lower cup members, each including a bead portion thereon in non-contacting relation with respect to one another, a Bellville spring of greater diameter than either cup member and adapted to rest on said shoulder in the steering wheel cavity when the mechanism is assembled therewith, said spring being interposed between said two beads on said cup members and normally in contact with only one of said beads when the periphery of the spring rests on said shoulder, and a plurality of rivets loosely passed through said cups and spring for assembling the several parts into a unit and for limiting the maximum movement therebetween, said rivets being of a non-conducting nature with respect to one of said cups and the spring, said spring being operable to snap into engagement with the other of said beads when pressure is applied to one of said cup members.

2. The mechanism as claimed in claim 1 wherein each of said rivets includes an insulating sleeve therearound for insulating the rivets from one of said cups therein.

3. The mechanism as claimed in claim 1 wherein one of said cups is flanged outwardly and the other of said cups is flanged inwardly and wherein the beads are carried by the flanged portions of the cups.

4. A horn button assembly for a steering wheel which includes a hub cavity having a shoulder therearound and having a central aperture therein through which a steering column passes and projects, said column being held to the steering wheel by means of a nut and including a spring pressed brush assembly centrally located in an insulated bushing at the end thereof which brush also projects into said cavity and forms one side of an electrical circuit wherein the steering column comprises the other side thereof, the combination comprising; an apertured cup member adapted to pass over the projecting end of the steering column and held in tight engagement thereto by means of said nut, said cup including an outwardly extending flange at the upper end thereof which has an upwardly projecting bead adjacent its inner periphery which is positioned below the shoulder in said cavity, a Bellville spring having a central aperture, said spring being of a greater diameter than said flanged cup and substantially the same diameter as said cavity, said spring being adapted to rest on said shoulder for locating the spring coaxially within the cavity, a second centrally apertured cup member having a downwardly extending bead of different diameter than the bead on said first cup member, a plurality of rivets insulated from the second cup member and the spring for loosely connecting the upper and lower cup members with the spring therebetween wherein the spring is normally in contact only with the bead around the upper cup member, a strap for bridging the upper cup member and including a portion that passes downwardly through the aperture therein and into engagement with said brush, and a cap for closing the upper open end of said upper cup member for holding said strap in place whereby circuit is established when said cap is depressed for causing said spring to snap into engagement with the bead of the lower cup member.

References Cited in the file of this patent

UNITED STATES PATENTS

| 2,119,752 | Pulleyblank | June 7, 1938 |
| 2,221,409 | Phelps et al. | Nov. 12, 1940 |
| 2,555,510 | Sampson | June 5, 1951 |